United States Patent
Haga et al.

(10) Patent No.: US 9,143,753 B2
(45) Date of Patent: Sep. 22, 2015

(54) 3D IMAGE DISPLAY APPARATUS AND CONTROL METHOD FOR SAME

(75) Inventors: Minoru Haga, Kawasaki (JP); Yuzo Sato, Hachioji (JP)

(73) Assignee: Canon Kabushiki Kaisha, Tokyo (JP)

(*) Notice: Subject to any disclaimer, the term of this patent is extended or adjusted under 35 U.S.C. 154(b) by 944 days.

(21) Appl. No.: 13/332,892

(22) Filed: Dec. 21, 2011

(65) Prior Publication Data

US 2012/0176373 A1 Jul. 12, 2012

(30) Foreign Application Priority Data

Jan. 7, 2011 (JP) ................................ 2011-002488

(51) Int. Cl.
*H04N 13/04* (2006.01)
*H04N 13/00* (2006.01)

(52) U.S. Cl.
CPC ....... *H04N 13/0007* (2013.01); *H04N 13/0422* (2013.01); *H04N 13/0438* (2013.01); *H04N 13/0497* (2013.01)

(58) Field of Classification Search
CPC .......... H04N 13/0438; H04N 13/0497; H04N 13/00; H04N 2213/008; G09G 3/003; G09G 2310/08; G09G 2320/0285; G09G 2340/0435; G09G 2340/16; G09G 3/3611; G06T 15/50
See application file for complete search history.

(56) References Cited

U.S. PATENT DOCUMENTS

| 6,448,952 | B1 | 9/2002 | Toyoda et al. | |
| 8,564,650 | B2 | 10/2013 | Nakahata | |
| 2004/0246275 | A1* | 12/2004 | Yoshihara et al. | 345/690 |
| 2009/0122047 | A1* | 5/2009 | Yamamoto et al. | 345/211 |
| 2010/0104262 | A1* | 4/2010 | Kanamaru et al. | 386/95 |
| 2011/0025671 | A1* | 2/2011 | Lee | 345/211 |
| 2011/0096146 | A1* | 4/2011 | Hulyalkar et al. | 348/43 |
| 2011/0205345 | A1* | 8/2011 | Choi et al. | 348/56 |
| 2011/0216175 | A1* | 9/2011 | Shimoyama et al. | 348/56 |
| 2011/0279451 | A1 | 11/2011 | Haga | |
| 2011/0285712 | A1* | 11/2011 | Arai et al. | 345/426 |
| 2012/0062588 | A1 | 3/2012 | Sato | |
| 2012/0069163 | A1* | 3/2012 | Endo | 348/56 |
| 2012/0098830 | A1* | 4/2012 | Kim | 345/419 |
| 2012/0188473 | A1* | 7/2012 | Chang et al. | 349/15 |
| 2015/0029236 | A1* | 1/2015 | De Greef | 345/690 |

FOREIGN PATENT DOCUMENTS

| JP | 2000-275575 A | 10/2000 |
| JP | 2011-069963 A | 4/2011 |

* cited by examiner

*Primary Examiner* — Sath V Perungavoor
*Assistant Examiner* — Peter D Le
(74) *Attorney, Agent, or Firm* — Fitzpatrick, Cella, Harper & Scinto

(57) ABSTRACT

A 3D image display has a display unit which is driven so as to emit light in a line-sequential or a block-sequential manner; a storage unit which stores characteristics information relating to temporal change in transmittance of a liquid crystal shutter glasses with respect to light of respective primary colors in the display unit; and a correction unit which corrects an input image signal of the respective primary colors using the characteristics information, so as to reduce color fluctuation between lines or between blocks in the observed image caused by differences in the temporal change of the transmittance of the liquid crystal shutter glasses in respect of each of the primary colors, wherein the display unit displays a corrected image based on a corrected image signal generated by the correction unit.

13 Claims, 10 Drawing Sheets

FIG.4

| COLOR | LINE | ATTENUATION COEFFICIENT |
|---|---|---|
| R | 1 | 0.50 |
| | 2 | 0.51 |
| | ⋮ | ⋮ |
| | 1079 | 0.99 |
| | 1080 | 1.00 |
| G | 1 | 0.60 |
| | 2 | 0.61 |
| | ⋮ | ⋮ |
| | 1079 | 0.99 |
| | 1080 | 1.00 |
| B | 1 | 1.00 |
| | 2 | 0.99 |
| | ⋮ | ⋮ |
| | 1079 | 0.71 |
| | 1080 | 0.70 |

3D IMAGE DISPLAY APPARATUS AND CONTROL METHOD FOR SAME

BACKGROUND OF THE INVENTION

1. Field of the Invention

The present invention relates to a 3D image display apparatus for viewing images through shutter glasses and a control method for such an apparatus.

2. Description of the Related Art

A 3D image display apparatus based on a frame-sequential method is known, in which a three-dimensional image (a 3D image) is composed by alternately displaying a right eye image and a left eye image having parallax, and causing different images to be viewed by the right eye and the left eye through shutter glasses (see Japanese Patent Application Publication No. 2000-275575). Shutter glasses mainly use a liquid crystal type of shutter, in which liquid crystal shutters each comprising a mutually superimposed liquid crystal element plate and polarizing plate that perform a shutter opening and closing operation, are provided for the left eye and the right eye.

An ideal relationship between the transmission response characteristics of the shutter glasses and the display timing of an image in a 3D image display apparatus based on a frame-sequential method is described here with reference to FIG. 9A, FIG. 9B and FIG. 9C. FIG. 9A shows the transmission response characteristics (the temporal change in transmittance (transmissivity)) of ideal shutter glasses; the horizontal axis represents time and the vertical axis represents the transmittance of the shutter glasses. The solid line 12 indicates the transmission response characteristics of the left-eye shutter and the dotted line 13 indicates the transmission response characteristics of the right-eye shutter. It is known that there exists a delay caused by the response speed of the liquid crystals, in the opening and closing of the shutter. The diagonal portions from "open" to "close" and "close" to "open" in the solid line 12 and the dotted line 13 indicate this delay. FIG. 9B shows a schematic view of a left eye image and a right eye image, in which the horizontal axis represents time and the vertical axis represents the display brightness. The solid line 14 shows the light emission characteristics for the left eye, and the diagonally hatched portion is a schematic view of the brightness of the left eye image. The dotted line 15 shows the light emission characteristics for the right eye, and the diagonally hatched portion is a schematic view of the brightness of the right eye image. In order to simplify this description, FIG. 9B shows an example in which an image of uniform brightness is displayed.

FIG. 9C shows the brightness in a case where an observer observes an image having the characteristics shown in FIG. 9B, through shutter glasses having the characteristics in FIG. 9A. The vertical axis in FIG. 9C shows the observed brightness. In the light emission time (t2 to t3) of the left eye image 14, the left eye shutter assumes an open state, the right eye shutter assumes a closed state, and therefore the light 16 of the left eye image is transmitted by the left eye shutter only. Conversely, in the light emission period of the right eye image, the light 17 of the right eye image is transmitted only by the right eye shutter. Therefore, the observer observes only the left eye image with the left eye, and observes only the right eye image with the right eye.

If the shutter glasses have the ideal transmission response characteristics shown in FIG. 9A, then as shown in FIG. 9C, the display image is observed correctly by the observer. However, the actual transmission response characteristics of a liquid crystal shutter based on a TN method or an STM method which is generally used in shutter glasses do not conform to the ideal characteristics shown in FIG. 9A. Moreover, based on experimentation by the present inventors, it was found that the transmission response characteristics of a liquid crystal shutter vary with the wavelength (color) of the transmitted light, as described below.

FIG. 10A shows the results obtained when respective monochromatic images of R, G and B are displayed using an image display apparatus based on three primary light emission colors of R (red), G (green) and B (blue), and measuring change in the light transmittance of the liquid crystal shutter in respect of each color. FIG. 10A shows the transmission response characteristics in relation to R light, G light and B light, sequentially from the top part of the diagram, in which the horizontal axis represents time and the vertical axis represents the transmittance. The time t1 indicates the timing at which the shutter opens, time t3 indicates the timing at which the shutter closes, and t2 to t3 indicates one field period.

It is known in relation to the transmission response characteristics 20 with respect to R light that the transmittance in the first half is low, and that transmittance of only approximately 50% of the maximum transmittance is obtained at the start time t2 of one field period. In the transmission response characteristics 21 with respect to G light, the transmittance in the first half is low, and although the transmittance is slightly higher than the transmittance of R light, transmittance of only approximately 60% of the maximum transmittance is obtained at the time t2. Furthermore, the transmission response characteristics 22 in relation to B light are the reverse of R light and G light, in that the transmittance rises quickly, but then falls in the second half and at time t3, becomes approximately 70% of the maximum transmittance. These differences in transmittance depending on the color are thought to be caused by wavelength dispersion.

FIG. 10B shows the brightness in a case where an observer observes an image 14 having the characteristics shown in FIG. 9B, through shutter glasses having the characteristics in FIG. 10A. Even if image display is carried out at a uniform brightness throughout one field period, the R image and the G image appear dark in the first half of the period and the B image appears dark in the second half of the period. Therefore, if a white image (an image in which the RGB brightness ratios are the same) is displayed on a hold-driven liquid display monitor, for example, a phenomenon occurs in which the RGB brightness ratio changes over time within one field period. More specifically, at the start of the one field period, a slightly cyan bluish white image is observed, the image gradually becomes pure white, and finally, changes to a slightly yellowish white. However, since temporal change in color within an extremely short period of time such as one field period is practically impossible to observe with the naked eye, this phenomenon has not presented a problem in conventional 3D display apparatuses using a hold-driven liquid crystal display.

However, in the case of a 3D image display apparatus using a display monitor based on a drive method which emits light in a line-sequential or block-sequential manner, variations in the transmission response characteristics of the liquid crystal shutter glasses depending on the wavelength can have a great effect on the quality of the displayed image. The problems which occur in a display using line-sequential light emission are now described with reference to FIG. 9D. In the case of 1080p HDTV, 1080 scanning lines emit light sequentially from the top to the bottom of the screen in one field period. Consequently, when the display image in FIG. 9D is observed through shutter glasses having the characteristics in FIG. 10A, the line 18 at the upper end of the screen which emits light first appears to be slightly cyan compared with the central portion of the screen, and the line 19 at the lower end of the screen which emits light last appears to be slightly yellow compared with the central portion of the screen. In this way, in the case of a display based on line-sequential light emission, variations in the transmission response characteristics depending on the wavelength are observed as spatial fluctuations in color and brightness, and therefore are liable to be recognized as decline in the display quality. A similar problem occurs in the case of a display based on a method which divides a screen into a plurality of blocks and causes the blocks to emit light sequentially (block-sequential light emission).

One example of a display using line-sequential emission is a field emission display (FED), or the like. Furthermore, examples of a display using block-sequential emission are a field emission display, a backlight scanning liquid crystal display, an organic electroluminescence display, and the like.

SUMMARY OF THE INVENTION

The present invention was devised in view of the foregoing circumstances, an object thereof being to enable the display of a 3D image of high quality by suppressing spatial fluctuations in color and/or brightness which occur when an image on a display which emits light in a line-sequential or block-sequential manner is observed with liquid crystal shutter glasses.

The present invention in its first aspect provides a 3D image display apparatus for causing a left eye image and a right eye image that are displayed by a frame-sequential method to be observed through liquid crystal shutter glasses, the apparatus including: a display unit which is driven so as to emit light in a line-sequential or a block-sequential manner; a storage unit which stores characteristics information relating to temporal change in transmittance of the liquid crystal shutter glasses with respect to light of respective primary colors in the display unit; and a correction unit which corrects an input image signal of the respective primary colors using the characteristics information, so as to reduce color fluctuation between lines or between blocks in the observed image caused by differences in the temporal change of the transmittance of the liquid crystal shutter glasses in respect of each of the primary colors, wherein the display unit displays a corrected image based on a corrected image signal generated by the correction unit.

The present invention in its second aspect provides a control method for a 3D image display apparatus which has a display unit that is driven so as to emit light in a line-sequential or a block-sequential manner and which causes a left eye image and a right eye image that are displayed by a frame-sequential method to be observed through liquid crystal shutter glasses, the control method including the steps of: reading characteristics information from a storage unit which stores characteristics information relating to temporal change in transmittance of the liquid crystal shutter glasses with respect to light of respective primary colors in the display unit; correcting an input image signal of the respective primary colors by using the characteristics information so as to reduce color fluctuation between lines or between blocks in the observed image caused by differences in the temporal change of the transmittance of the liquid crystal shutter glasses in respect of each of the primary colors; and displaying on the display unit a corrected image based on a corrected image signal generated in the correcting step.

According to the present invention, it is possible to display a 3D image of high quality by suppressing spatial fluctuations in color and/or brightness which occur when an image on a display which emits light in a line-sequential or block-sequential manner is observed with liquid crystal shutter glasses.

Further features of the present invention will become apparent from the following description of exemplary embodiments with reference to the attached drawings.

BRIEF DESCRIPTION OF THE DRAWINGS

FIG. 4 is a diagram showing one example of a shutter glasses characteristics information table;

DESCRIPTION OF THE EMBODIMENTS

Below, embodiments of the present invention are described with reference to the drawings.
(System Composition)

Figure 2:
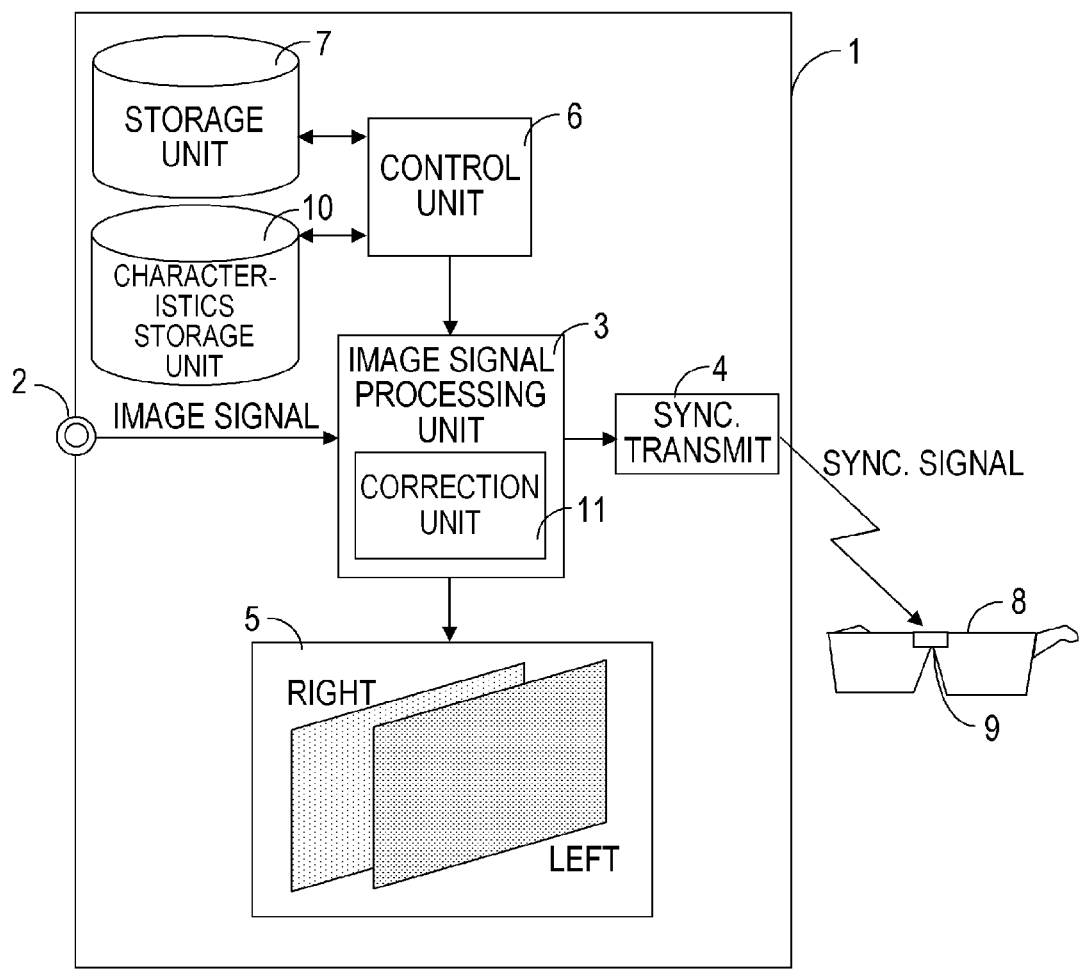
FIG. 2 shows a schematic view of the composition of a 3D image display system relating to an embodiment of the present invention.

FIG. 2 shows a schematic view of the composition of a 3D image display system relating to an embodiment of the present invention. A 3D image display system is constituted by a 3D image display apparatus 1 and shutter glasses 8. The 3D image display apparatus 1 comprises: an image signal input terminal 2, an image signal processing unit 3, a synchronization signal transmission unit 4, an image display unit 5, a control unit 6, a storage unit 7 and a shutter glasses transmission response characteristics storage unit (hereinafter, called "characteristics storage unit") 10. The image signal processing unit 3 has a correction unit 11 which carries out correction processing on an image signal. Furthermore, the shutter glasses 8 are liquid crystal shutter glasses comprising liquid crystal shutters for the left eye and the right eye, and a synchronization signal reception unit 9. Here, the image display unit 5 is a display panel based on a drive method which emits light in a line-sequential or block-sequential manner, for example, a field emission display, a backlight scanning liquid crystal display, an organic EL display, or the like.

In the composition in FIG. 2, the 3D image signal input from the input terminal 2 is divided into a left image signal, a right image signal, a synchronization signal, and the like, by the image signal processing unit 3. These images signals are then subjected to correction processing by the correction unit 11 in order to reduce spatial fluctuation in the color and brightness caused by variations in the transmission response characteristics of the shutter glasses 8 depending on the wavelength, and are then output to the image display unit 5. The details of this correction processing are described hereinafter. The image display unit 5 alternately displays a left eye image (hereinafter, called simply "left image") and a right eye image (hereinafter, called simply "right image") on the basis of the corrected left image signal and right image signal. A method which alternately displays a left image and a right image in this way is called a frame-sequential method.

On the other hand, the image signal processing unit 3 generates a shutter glasses synchronization signal which is synchronized to the display timing of the image display unit 5, and outputs this signal to the synchronization signal transmission unit 4. The synchronization signal transmission unit 4 sends the shutter glasses synchronization signal to the shutter glasses 8. This synchronization signal is desirably sent by wireless communication, such as infrared or radio communication, for example. The shutter glasses 8 control the opening and closing of the left and right liquid crystal shutters in synchronism with the display of the left image and the right image by the image display unit 5, in accordance with the synchronization signal received by the synchronization signal reception unit 9. By this means, when an image displayed on the image display unit 5 is observed through shutter glasses 8, then the left image only is observed by the left eye and the right image only is observed by the right eye.

In a case where a 3D image is displayed by a frame-sequential method, using a display unit which emits light in a line-sequential or block-sequential manner, fluctuations in color or brightness are liable to occur between lines or blocks in the observed image due to the transmission response characteristics of the shutter glasses. Therefore, in the present embodiment, the image signal is subjected to correction processing as described below, thereby reducing fluctuations in color and brightness.

Figure 10A:
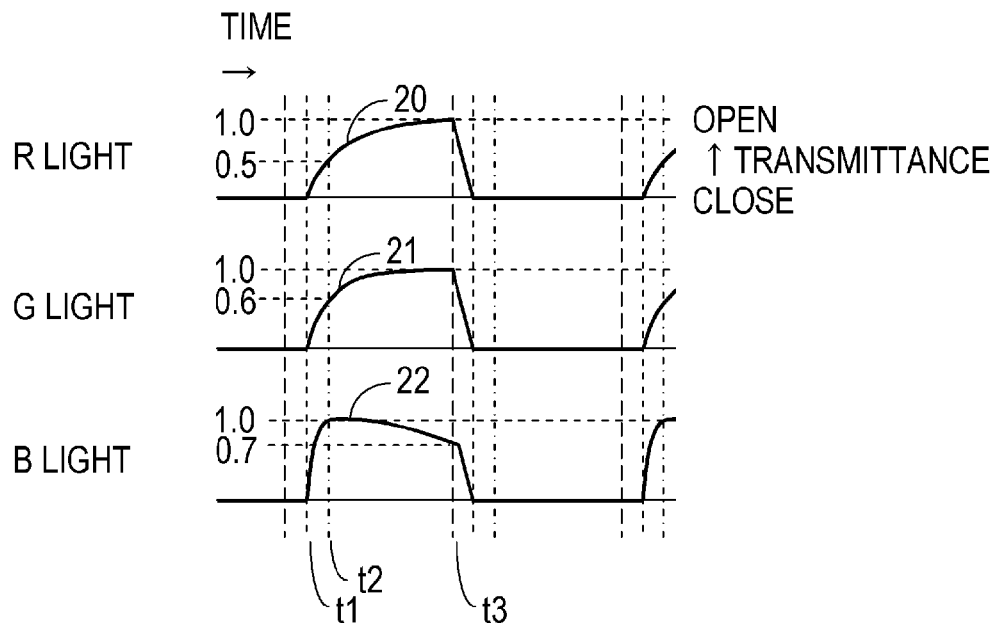
FIG. 10A and FIG. 10B are diagrams which describe temporal change in the transmittance of shutter glasses in relation to respective primary colors.
Figure 10B:
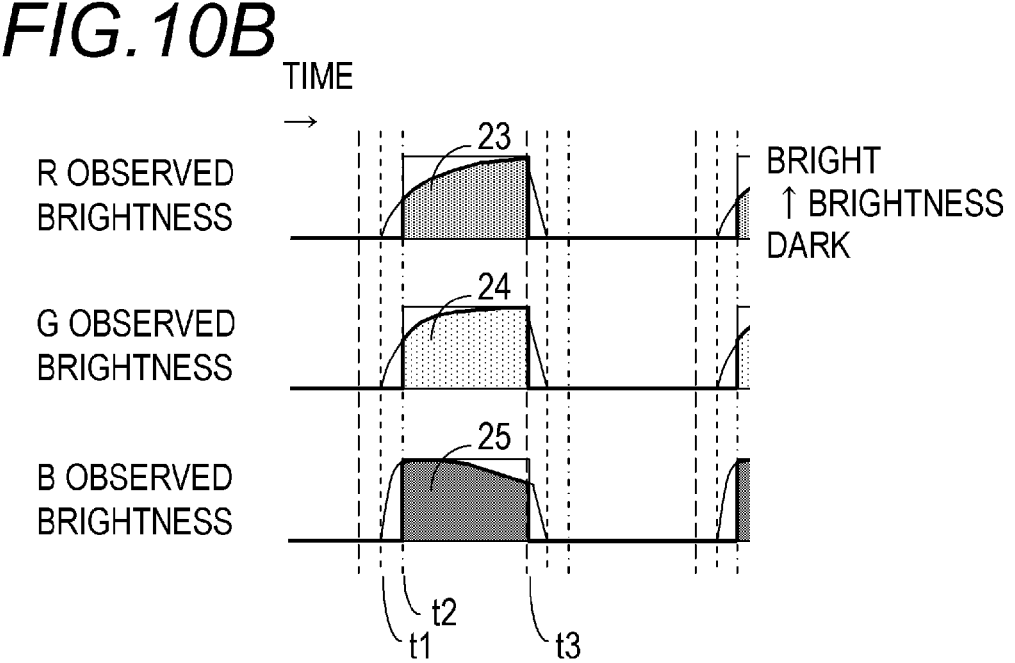

Firstly, characteristics information relating to the transmission response characteristics (the temporal change in transmittance) of the shutter glasses 8 for each primary color as measured by experimentation are stored in advance in the characteristics storage unit 10. If the transmission response characteristics differ according to various conditions, such as the type of shutter glasses 8, the drive frequency of the image display unit 5, and the like, then characteristics information for respective conditions is stored in the characteristics storage unit 10. When image display is started, the control unit 6 reads out suitable characteristics information from the characteristics storage unit 10, and the image processing unit 3 is controlled by means of this characteristics information. The correction unit 11 of the image processing unit 3 generates a corrected image signal which compensates for attenuation of the transmitted light due to the liquid crystal shutter by using the characteristics information for each primary color of the transmitted light. In other words, since the transmittance of light changes over time, as shown in FIGS. 10A and 10B, then the amount of attenuation of the transmitted light varies with each line or each block, depending on the sequence of light emission. Therefore, the difference in the amount of attenuation is made as close as possible to zero, by raising the value of the image signal corresponding to lines (or blocks) which have a relatively high amount of attenuation and/or reducing the value of the image signal corresponding to lines (or blocks) which have a relatively small amount of attenuation. Accordingly, it is possible to restore the color and brightness, or to achieve uniform color, and the quality of the display image can be improved.

Below, concrete embodiments of correction processing will be described. In the embodiment described below, correction processing in a line-sequential light emission display which emits light of three primary colors of R, G and B is described, but the present invention can also be applied to a display which uses a block-sequential light emission method or which emits light of four or more primary colors.

(First Embodiment)

The first embodiment is a method which cancels out the amount of attenuation due to the liquid crystal shutter and an amount of increase in the light emission brightness, by multiplying the image signal by a gain (correction value) corresponding to the reciprocal of the transmittance. According to this method, it is possible to restore the color and brightness in accordance with the input image signal.

FIG. 4 is one example of characteristics information which is stored in the characteristics storage unit 10. The characteristics information is a table which stores a value representing transmittance for each line, as an attenuation coefficient. The transmission response characteristics 20 to 22 shown in FIG. 10A are defined in numerical terms on the basis of the light emission timings of the respective lines, and are determined from actual measurement values or an approximation based on actual measurement values. Since the transmission response characteristics vary respectively for R, G, B, then a characteristics information table is prepared for each color.

Figure 3:
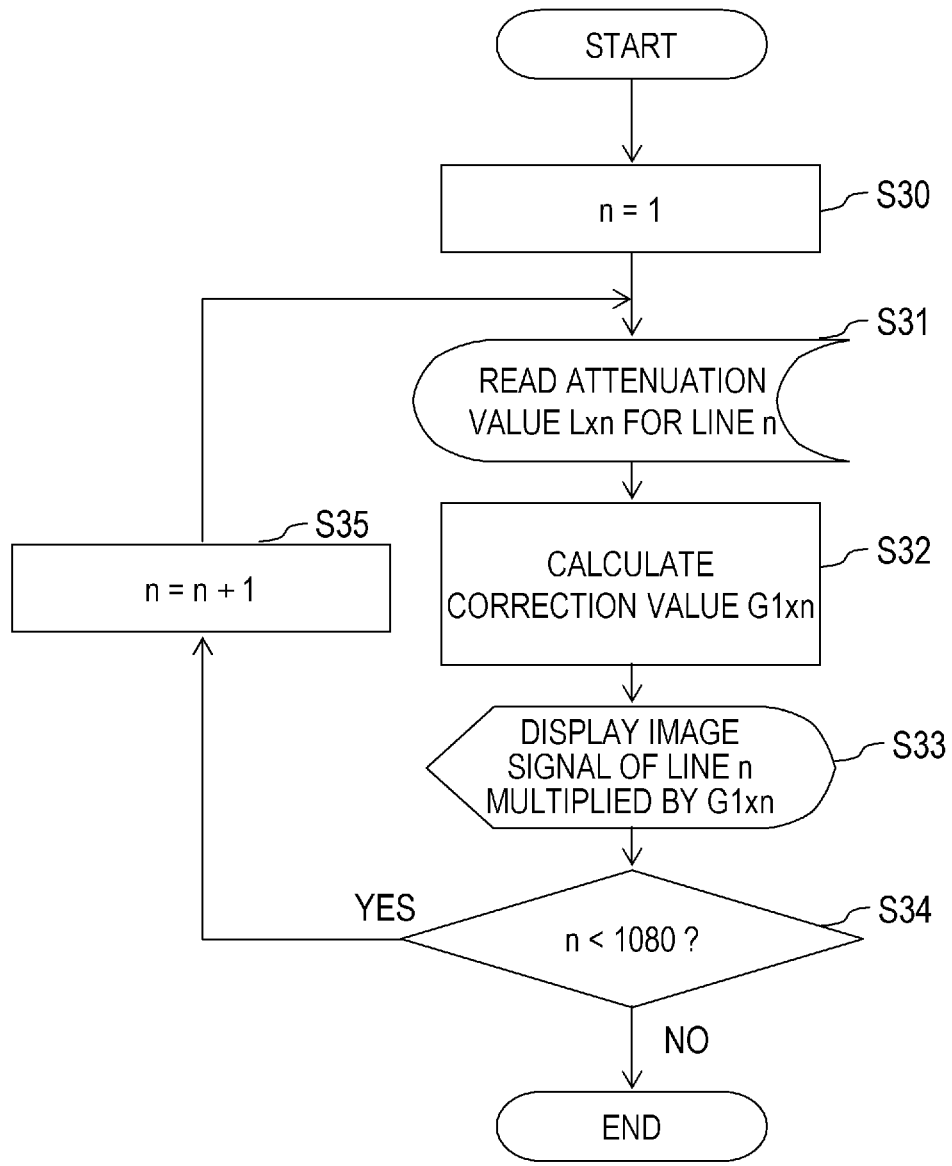
FIG. 3 is a flowchart of a correction process according to a first embodiment.

The flow of correction processing according to the correction unit 11 is described with reference to the flowchart in FIG. 3. The correction unit 11 firstly resets the variable n which represents the line number, to 1 (step S30). Thereupon, the correction unit 11 reads in an attenuation coefficient Lxn for line n from the R, G, B characteristics information tables (step S31), and determines a correction value G1xn by means of the following calculation (step S32). The suffix x represents the emitted primary color (x=R, G, B) and n represents the line number (in the case of 1080p, $1 \leq n \leq 1080$).

$$G1xn = 1/Lxn$$

For example, in the case of the first line, LR1=0.50, LG1=0.60, LB1=1.00, and therefore the correction values are found to be G1R1=2.00, G1G1=1.67, and G1B1=1.00.

Thereupon, the correction unit 11 determines a corrected image signal by multiplying the correction value G1xn by the image signals of the respective colors for line n, and outputs the corrected image signal to the image display unit 5 (step S33). The processing described above is carried out for all of the lines (steps S34 and S35).

Figure 1A:
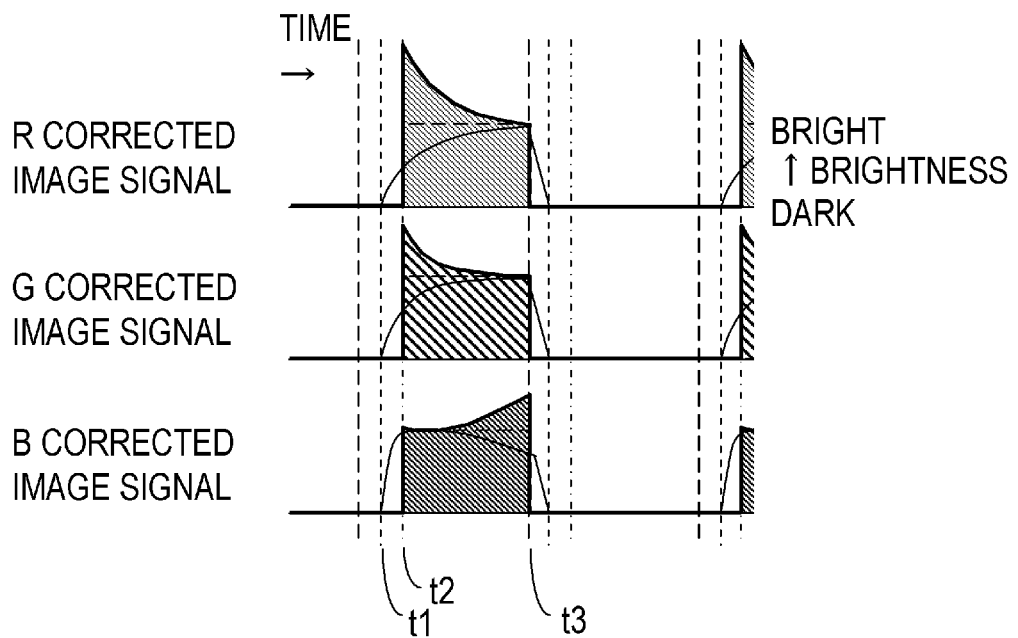
FIG. 1A and FIG. 1B are diagrams showing an example of corrected image signals and observed brightnesses for respective colors according to a first embodiment of the invention.

FIG. 1A shows the results of applying the correction processing described above to an input image signal of a full white image, in other words, an image signal which has a maximum gradation for each of R, G, B throughout the whole screen. FIG. 1A shows R, G, B corrected image signals sequentially from the upper graph in the drawings. It is known that the value of the image signal becomes greater, the larger the amount of attenuation caused by the liquid crystal shutter. More specifically, since the transmittance increases gradually in the case of R and G light (first primary color), then the brightness of the corrected image is made to become higher, the earlier the position of the line in the sequence of light emission. On the other hand, since the transmittance decreases gradually in the case of B light (second primary color), then the brightness of the corrected image is made to become higher, the later the position of the line in the sequence of light emission.

Figure 1B:
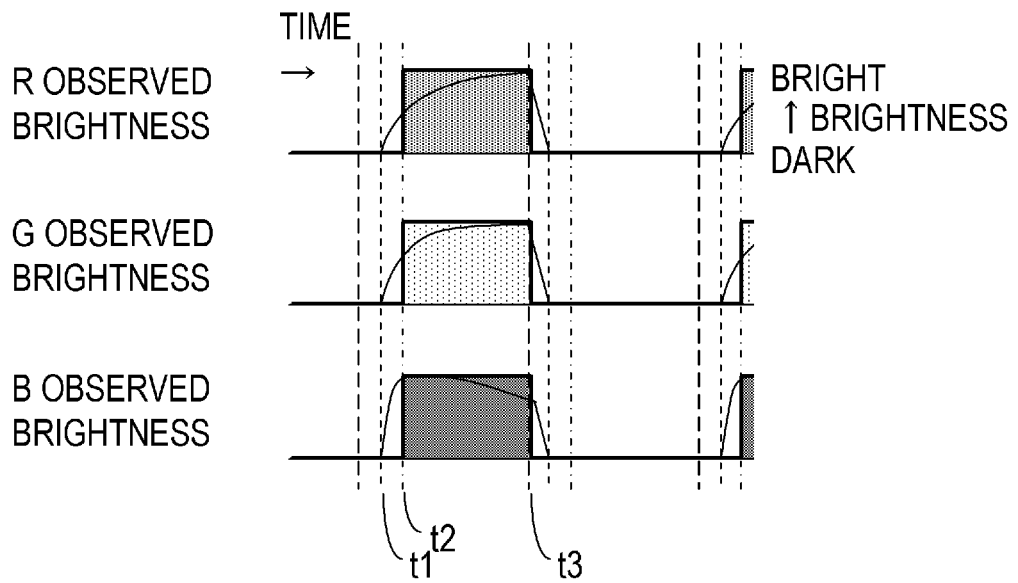

FIG. 1B shows the observed brightness when an image (corrected image) which is displayed on the basis of the corrected image signal in FIG. 1A is observed through the shutter glasses 8. The amount of attenuation due to the liquid crystal shutter and the amount of increase in the light emission brightness due to correction cancel each other out, and the ratio of the observed brightnesses of RGB becomes the same as the ratio of the RGB values in the original input image signal, thus reducing color fluctuations between the lines. Moreover, as can be seen from FIG. 1B, the respective observed brightnesses of RGB are the same as the brightnesses corresponding to the values of the input image signal, and therefore fluctuation in brightness between lines is also reduced and the brightness can be restored to that of the input image signal. Consequently, a high-quality 3D image display is achieved.

(Second Embodiment)

In the method according to the first embodiment, the value of the corrected image signal may exceed the maximum value of the input image signal, and therefore the image display unit 5 needs to have a capability for displaying images which are even brighter than the maximum brightness of the input image signal. In other words, if the display capability of the image display unit 5 is low and a display of high brightness is not possible, then it is difficult to apply the method in the first embodiment. Therefore, in the second embodiment, the values of the corrected image signal are prevented from exceeding the maximum value that can be taken by the input image signal, by uniformly reducing all of the values of the corrected image signal.

Figure 6:
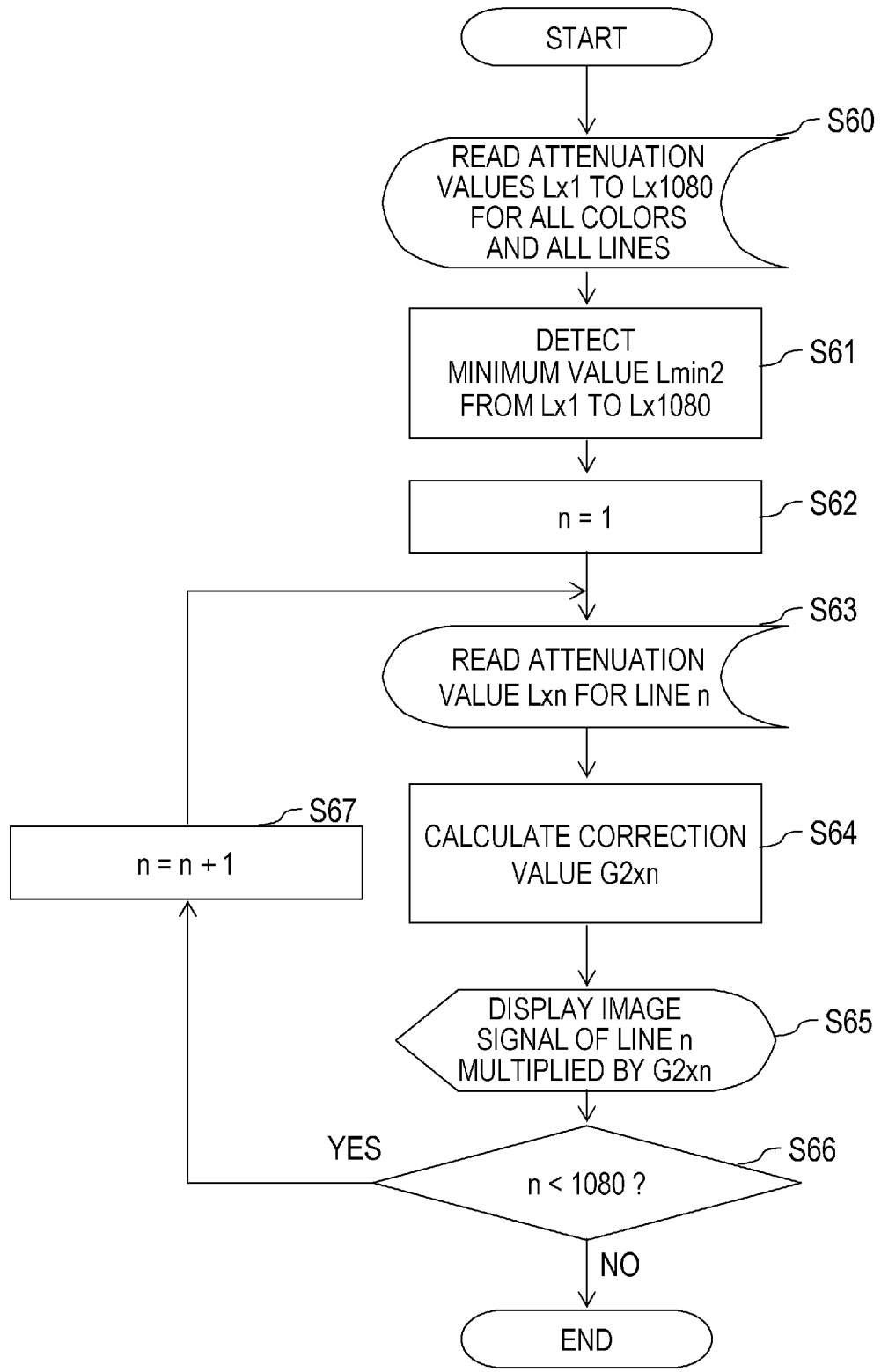
FIG. 6 is a flowchart of a correction process according to a second embodiment.

The flow of correction processing according to the correction unit 11 is now described with reference to the flowchart in FIG. 6. As a pre-processing step, the correction unit 11 reads in the attenuation coefficients LR1 to LR1080, LG1 to LG1080, LB1 to LB1080 of all of the colors and all of the lines from the characteristics information table (step S60). The minimum value Lmin2 of the attenuation coefficients is detected (step S61).

The correction unit 11 then resets the variable n representing the line number, to 1 (step S62). Thereupon, the correction unit 11 reads in an attenuation coefficient Lxn for linen from the R, G, B characteristics information tables (step S63), and determines a correction value G2xn by means of the following calculation (step S64).

$$G2xn = Lmin2/Lxn$$

For example, in the case of the first line, since LR1=0.50, LG1=0.60, LB1=1.00, and in FIG. 4, Lmin2=0.50, then the correction values are found to be G2R1=1.00, G2G1=0.83, and G2B1=0.50. The correction value G2xn according to the present embodiment is obtained by normalizing the correction value G1xn of the first embodiment in such a manner that the maximum value is 1.00.

Thereupon, the correction unit 11 determines a corrected image signal by multiplying the correction value G2xn by the image signals of the respective colors for line n, and outputs the corrected image signal to the image display unit 5 (step S65). The processing described above is carried out for all of the lines (steps S66 and S67).

Figure 5A:
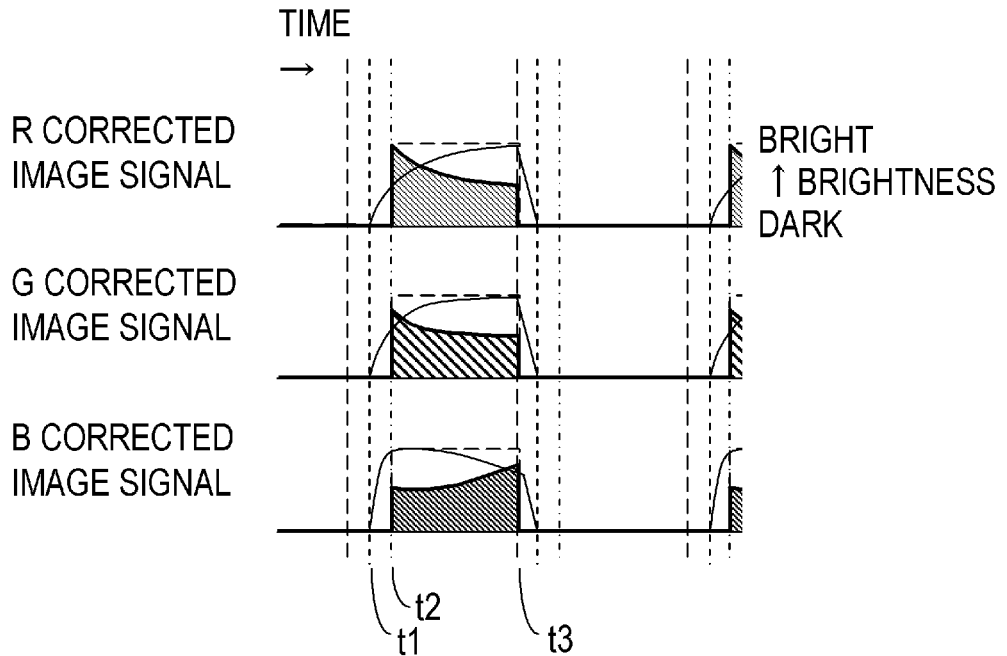
FIG. 5A and FIG. 5B are diagrams showing an example of corrected image signals and observed brightnesses for respective colors according to a second embodiment of the invention.
Figure 5B:
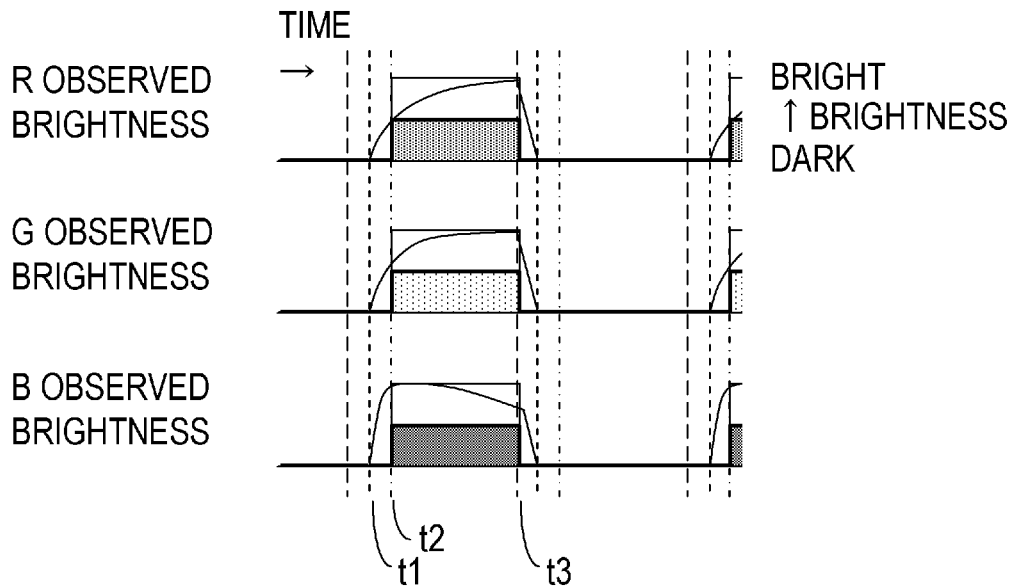

FIG. 5A shows the results of applying the correction processing described above to an input image signal of a full white image, in other words, an image signal which has a maximum gradation for each of RGB throughout the whole screen. FIG. 5A shows R, G, B corrected image signals sequentially from the upper graph in the drawings. It can be seen that the value of the image signal becomes lower, the smaller the amount of attenuation due to the liquid crystal shutter, and that the value of the correction image signal is kept within the maximum value of the input image signal. FIG. 5B shows the brightness when an image (corrected image) which is displayed on the basis of the corrected image signal in FIG. 5A is observed through the shutter glasses 8. In the method according to the present embodiment, the ratio of the observed brightnesses of RGB is the same as the ratio of the RGB values in the original input image signal, and color fluctuation between the lines is reduced. Furthermore, although the brightness of the whole image is reduced, the brightness fluctuation between the lines is lowered. Consequently, a high-quality 3D image display is achieved.

(Third Embodiment)

Similarly to the second embodiment, the method according to the third embodiment is one method which prevents the value of the corrected image signal from exceeding the maximum value that can be taken by the input image signal. The difference with respect to the second embodiment is that whereas in the second embodiment the value of the corrected image signal is adjusted on the basis of the smallest attenuation coefficient in the whole screen, in the third embodiment, the value of the corrected image signal is adjusted on the basis of the smallest attenuation coefficient for each line.

Figure 8:
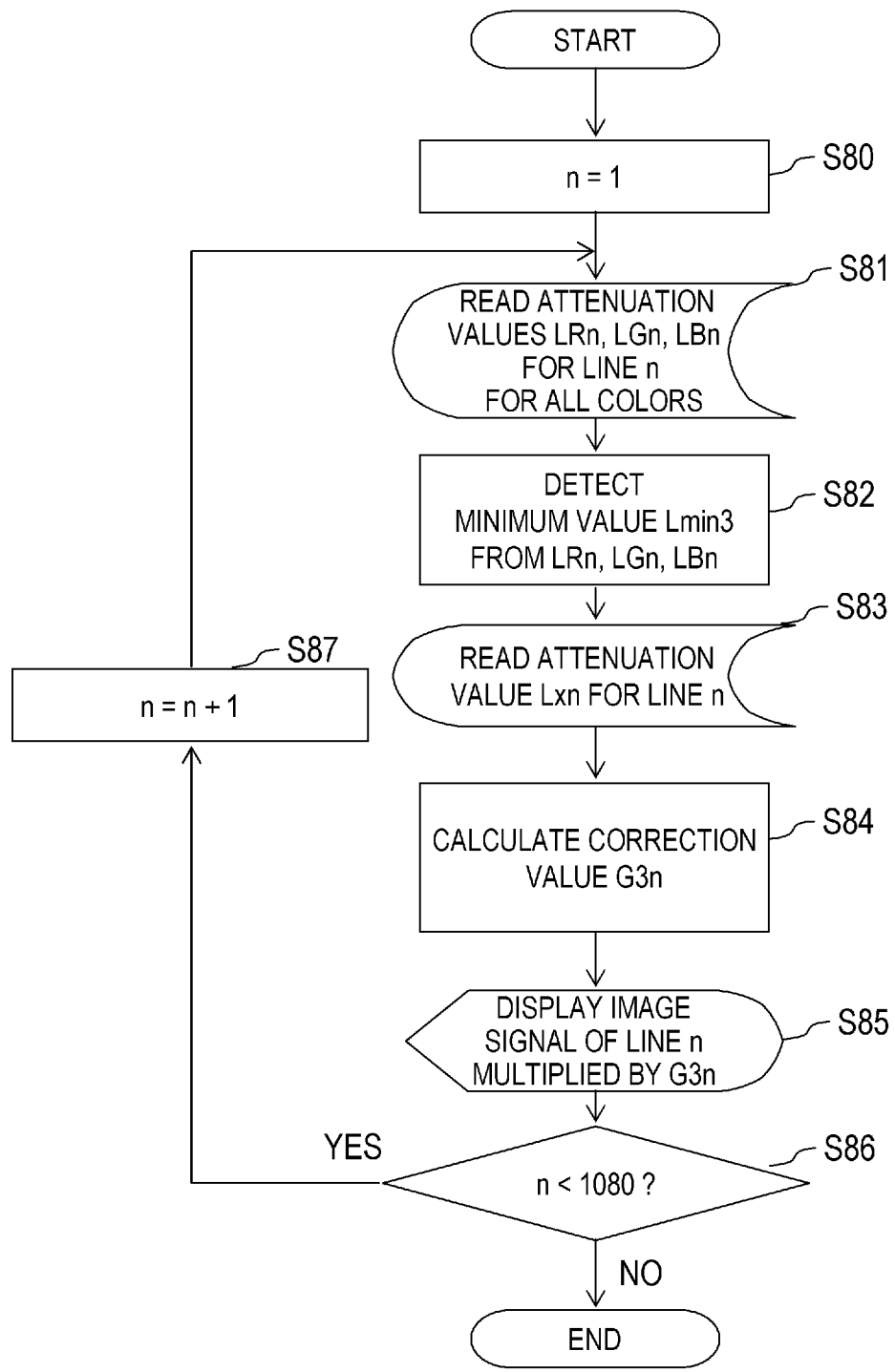
FIG. 8 is a flowchart of a correction process according to a third embodiment.
Figure 9A:
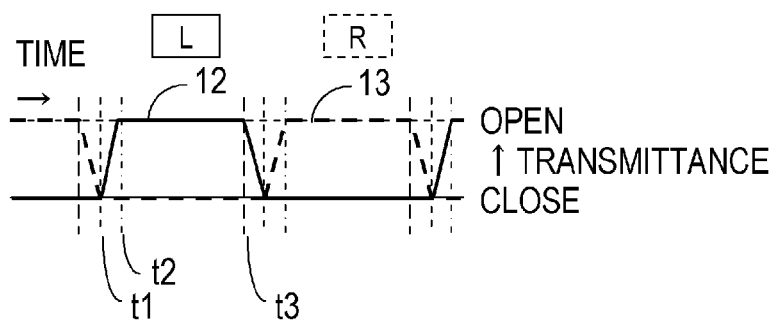
FIGS. 9A to 9D are diagrams showing transmission response characteristics of shutter glasses and image display timing.
Figure 9B:
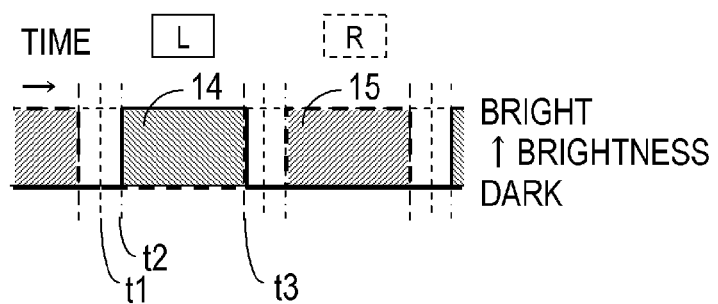
Figure 9C:
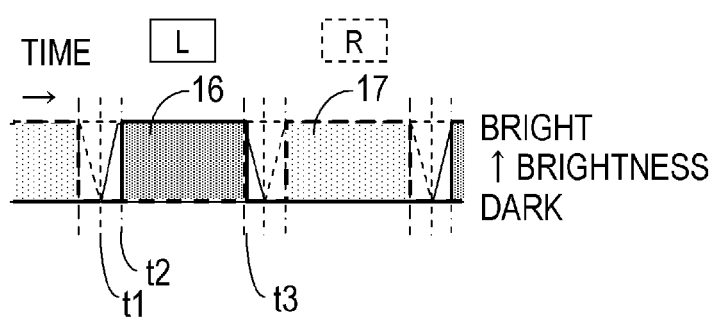
Figure 9D:
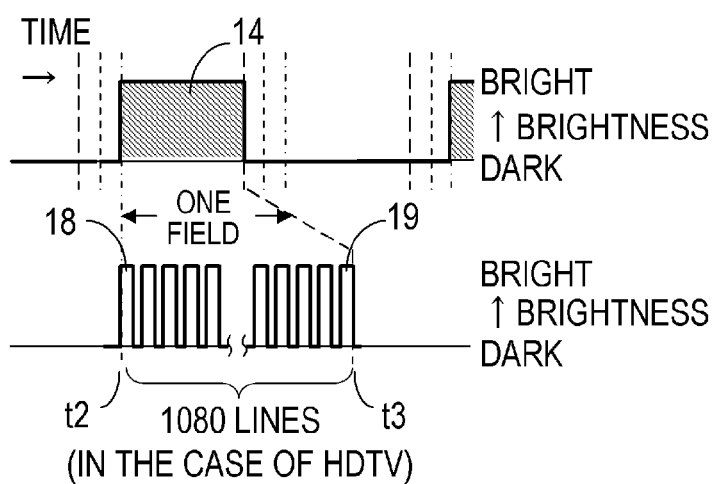

The flow of correction processing according to the correction unit 11 is now described with reference to the flowchart in FIG. 8. The correction unit 11 then resets the variable n representing the line number, to 1 (step S80). Thereupon, the correction unit 11 reads in attenuation coefficients LRn, LGn, LBn for line n from the R, G, B characteristics information tables (step S81), and finds the minimum value Lmin3 of these attenuation coefficients (step S82).

The correction unit 11 then determines the correction value G3xn by the following calculation, from the attenuation coefficients Lxn and Lmin3 of the respective colors for line n (steps S83 and S84).

$$G3xn = Lmin3/Lxn$$

For example, in the case of the first line, since LR1=0.50, LG1=0.60, LB1=1.00, and Lmin3=0.50, then the correction values are found to be G3R1=1.00, G3G1=0.83, and G3B1=0.50. Furthermore, in the case of the 1080th line, since LR1080=1.00, LG1080=1.00 and LB1080=0.70, and Lmin3=0.70, then the correction values are found to be G3R1080=0.70, G3G1080=0.70 and G3B1080=1.00.

Thereupon, the correction unit 11 determines a corrected image signal by multiplying the correction value G3xn by the image signals of the respective colors for line n, and outputs the corrected image signal to the image display unit 5 (step S85). The processing described above is carried out for all of the lines (steps S86 and S87).

Figure 7A:
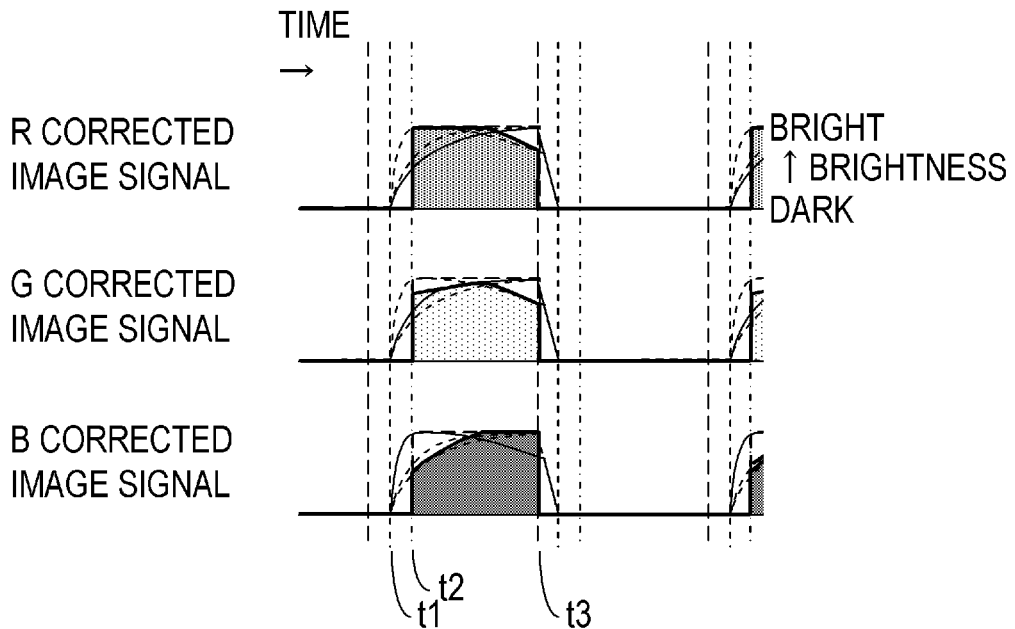
FIG. 7A and FIG. 7B are diagrams showing an example of corrected image signals and observed brightnesses for respective colors according to a third embodiment of the invention.
Figure 7B:
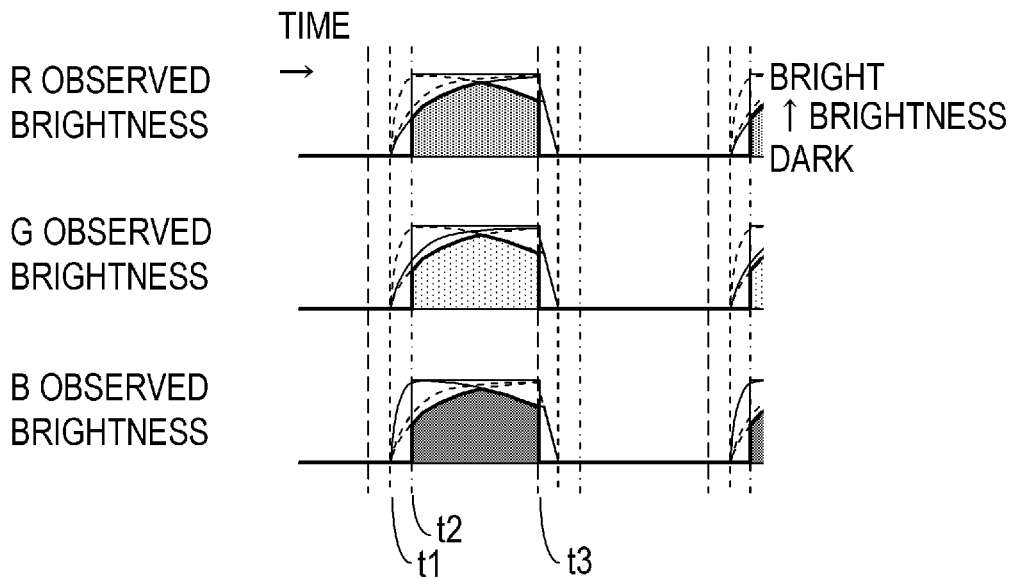

FIG. 7A shows the results of applying the correction processing described above to an input image signal of a full white image, in other words, an image signal which has a maximum gradation for each of RGB throughout the whole screen. FIG. 7A shows R, G, B corrected image signals sequentially from the upper graph in the drawings. FIG. 7B shows the brightness when an image (corrected image) which is displayed on the basis of the corrected image signal in FIG. 7A is observed through the shutter glasses 8. As can be seen from FIG. 7B, since the RGB brightness ratio is made uniform in each line, then the color fluctuation is reduced. Furthermore, it can also be seen that the reduction in brightness due to correction is suppressed in comparison with the second embodiment (FIG. 5B). If the method of the present embodiment is applied to a display based on block-sequential light emission, then the minimum value of the attenuation coefficients of each block should be multiplied by the image signal.

Concrete examples of the present invention were described with reference to the first to the third embodiments, but the scope of the present invention is not limited to these embodiments. For example, in the embodiment described above, attenuation coefficients Lxn are stored in a characteristics information table, but it is also possible to store correction values themselves in a characteristics information table. In this case, it is possible to omit the processing for finding the smallest value of the attenuation coefficients, and processing for determining correction values from the attenuation coefficients.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-002488, filed on Jan. 7, 2011, which is hereby incorporated by reference herein in its entirety.

What is claimed is:

1. A 3D image display apparatus for causing a left eye image and a right eye image that are displayed by a frame-sequential method to be observed through liquid crystal shutter glasses, the apparatus comprising:
   a display unit which is driven to emit light in a line-sequential or a block-sequential manner;
   a storage unit which stores characteristic information relating to temporal change in transmittance of the liquid crystal shutter glasses with respect to light of respective primary colors in the display unit; and
   a correction unit which corrects an input image signal of the respective primary colors using the characteristic information, to reduce color fluctuation between lines or between blocks in the observed image caused by differences in the temporal change of the transmittance of the liquid crystal shutter glasses in respect of each of the primary colors, wherein
   the display unit displays a corrected image based on a corrected image signal generated by the correction unit,
   the liquid crystal shutter glasses have characteristics by which the transmittance with respect to light of a first primary color gradually increases, and
   the correction unit generates the corrected image signal such that a brightness of a corrected image becomes higher the earlier the line or block is arranged in the sequence of light emission, when an image signal of only the first primary color is input.

2. A 3D image display apparatus for causing a left eye image and a right eye image that are displayed by a frame-sequential method to be observed through liquid crystal shutter glasses, the apparatus comprising:
   a display unit which is driven to emit light in a line-sequential or a block-sequential manner;
   a storage unit which stores characteristic information relating to temporal change in transmittance of the liquid crystal shutter glasses with respect to light of respective primary colors in the display unit; and
   a correction unit which corrects an input image signal of the respective primary colors using the characteristic information, to reduce color fluctuation between lines or between blocks in the observed image caused by differences in the temporal change of the transmittance of the liquid crystal shutter glasses in respect of each of the primary colors, wherein
   the display unit displays a corrected image based on a corrected image signal generated by the correction unit,
   the liquid crystal shutter glasses have characteristics by which the transmittance with respect to light of a second primary color gradually decreases, and
   the correction unit generates the corrected image signal such that a brightness of a corrected image becomes higher the later the line or block is arranged in the sequence of light emission, when an image signal of only the second primary color is input.

3. The 3D image display apparatus according to claim 1, wherein the correction unit generates the corrected image signal such that a ratio of observed brightnesses of the respective primary colors when the corrected image is viewed through the liquid crystal shutter glasses is the same as a ratio of values of the respective primary colors in the input image signal.

4. The 3D image display apparatus according to claim 1, wherein the correction unit generates the corrected image signal such that observed brightnesses of the respective primary colors when the corrected image is viewed through the liquid crystal shutter glasses is the same as brightnesses corresponding to values of the respective primary colors in the input image signal.

5. The 3D image display apparatus according to claim 1, wherein
   the characteristic information is a table of the transmittance or a reciprocal of the transmittance with respect to light of the respective primary colors, for each line or each block; and
   the correction unit determines values of the corrected image signal by multiplying values of the respective primary colors in the input image signal by the reciprocal of the corresponding transmittance.

6. The 3D image display apparatus according to claim 1, wherein
   the characteristic information is a table of the transmittance or a reciprocal of the transmittance with respect to light of the respective primary colors, for each line or each block; and
   the correction unit determines values of the corrected image signal by multiplying values of the respective primary colors in the input image signal by the reciprocal of the corresponding transmittance and a smallest value of all of the transmittances.

7. The 3D image display apparatus according to claim 1, wherein
   the characteristic information is a table of the transmittance or a reciprocal of the transmittance with respect to light of the respective primary colors, for each line or each block; and
   the correction unit determines values of the corrected image signal by multiplying values of the respective primary colors in the input image signal by the reciprocal of the corresponding transmittance and a smallest value of all of the transmittances in the corresponding line or block.

8. A control method for a 3D image display apparatus which has a display unit that is driven to emit light in a line-sequential or a block-sequential manner and which causes a left eye image and a right eye image that are displayed by a frame-sequential method to be observed through liquid crystal shutter glasses, the control method comprising the steps of:
   reading characteristic information from a storage unit which stores characteristic information relating to temporal change in transmittance of the liquid crystal shutter glasses with respect to light of respective primary colors in the display unit;

correcting an input image signal of the respective primary colors by using the characteristic information to reduce color fluctuation between lines or between blocks in the observed image caused by differences in the temporal change of the transmittance of the liquid crystal shutter glasses in respect of each of the primary colors; and displaying on the display unit a corrected image based on a corrected image signal generated in the correcting step, wherein the liquid crystal shutter glasses have characteristics by which the transmittance with respect to light of a first primary color gradually increases, and in the correction step, the corrected image signal is generated such that a brightness of a corrected image becomes higher the earlier the line or block is arranged in the sequence of light emission, when an image signal of only the first primary color is input.

9. The 3D image display apparatus according to claim 2, wherein the correction unit generates the corrected image signal such that a ratio of observed brightnesses of the respective primary colors when the corrected image is viewed through the liquid crystal shutter glasses is the same as a ratio of values of the respective primary colors in the input image signal.

10. The 3D image display apparatus according to claim 2, wherein the correction unit generates the corrected image signal such that observed brightnesses of the respective primary colors when the corrected image is viewed through the liquid crystal shutter glasses is the same as brightnesses corresponding to values of the respective primary colors in the input image signal.

11. The 3D image display apparatus according to claim 2, wherein the characteristic information is a table of the transmittance or a reciprocal of the transmittance with respect to light of the respective primary colors, for each line or each block; and the correction unit determines values of the corrected image signal by multiplying values of the respective primary colors in the input image signal by the reciprocal of the corresponding transmittance.

12. The 3D image display apparatus according to claim 2, wherein the characteristic information is a table of the transmittance or a reciprocal of the transmittance with respect to light of the respective primary colors, for each line or each block; and the correction unit determines values of the corrected image signal by multiplying values of the respective primary colors in the input image signal by the reciprocal of the corresponding transmittance and a smallest value of all of the transmittances.

13. The 3D image display apparatus according to claim 2, wherein the characteristic information is a table of the transmittance or a reciprocal of the transmittance with respect to light of the respective primary colors, for each line or each block; and the correction unit determines values of the corrected image signal by multiplying values of the respective primary colors in the input image signal by the reciprocal of the corresponding transmittance and a smallest value of all of the transmittances in the corresponding line or block.

\* \* \* \* \*